United States Patent Office 3,641,071
Patented Feb. 8, 1972

3,641,071
HYDROCARBOXYLATION REACTION TO FORM STRAIGHT-CHAIN ANHYDRIDES
Donald M. Fenton, Anaheim, Calif., assignor to Union Oil Company of California, Los Angeles, Calif.
No Drawing. Filed June 11, 1969, Ser. No. 832,414
Int. Cl. C07c *51/14*
U.S. Cl. 260—398                                          11 Claims

ABSTRACT OF THE DISCLOSURE

A process for the formation of straight-chain carboxylic acid anhydrides comprising contacting an ethylenically unsaturated hydrocarbon, carbon monoxide and a carboxylic acid with a Group VIII noble metal in complex association with a biphyllic ligand wherein the reaction is performed in a reaction medium containing 10 volume percent of a carboxylic acid anhydride for the entire or, at least, a substantial portion of the reaction period and at a temperature between 100° and 300° C. The presence of the anhydride has been found to increase the yield of straight-chain anhydrides.

DESCRIPTION OF THE INVENTION

The invention relates to the production of carboxylic acid anhydrides. More particularly, the invention relates to a method of improving the yield of straight-chain anhydrides.

It is known in the art that olefins, carbon monoxide and carboxylic acids can be reacted to form a mixture of straight-chain and branched-chain anhydrides. The straight-chain anhydrides are generally more useful and more valuable and hence it is desirable in the hydrocarboxylation reaction to increase the yield of straight-chain anhydrides.

According to the present invention, an alpha monoethylenically unsaturated hydrocarbon, carbon monoxide and a carboxylic acid are contacted with a Group VIII noble metal in complex association with a biphyllic ligand under liquid reaction conditions at temperatures between 100° and 300° C., in the presence of a carboxylic acid anhydride, e.g., acetic anhydride. The presence of the anhydride has been found to increase the yield of the straight-chain anhydride. The reaction proceeds according to the following equation:

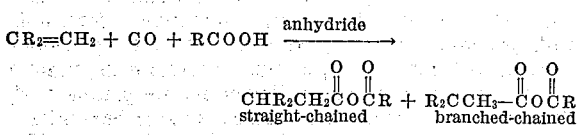

For purposes herein, a straight-chain anhydride refers to an anhydride formed by the alpha, as opposed to the beta carbon, of the ethylenically unsaturated hydrocarbon being covalently bonded to the carbon supplied by carbon monoxide as illustrated above.

Since the reaction yields an acid anhyride product, it will, with most processing and, particularly, with batch processing, increase the anhydride content of the reaction medium. The amount of anhydride in the reaction medium may not, however, be maintained at the concentrations and for the periods recited herein. And, even when the processing is such as to permit the accumulation of sufficient anhydride product to increase the anhydride content in a reaction medium to the levels and for the periods recited herein, an improvement can nevertheless be imparted to such processing if extraneous anhydride is added to the reaction medium before or during initiation of the reaction.

The invention comprises maintaining a concentration of anhydride in the liquid reaction medium from 10 to 85 volume percent preferably 20 to 85 volume percent, and most perferably 35 to 85 volume percent of the medium during the reaction. To obtain the enhanced yields of straight-chain anhydride, the reaction should be performed with these concentrations of anhydride present for a substantial portion of the reaction time such as from 30 to 100 percent of the time, preferably for a major portion of the reaction period such as from 55 to 100 percent of the period. This may be accomplished in a batch process by prolonging the reaction time to allow product anhydride build-up or, in a continuous process, refraining from withdrawing product anhydride until the desirable high anhydride concentration is achieved or in either a batch or continuous process, by the addition of extraneous anhydride.

Preferably, however, the reaction is initiated with a reaction medium containing 5 to 85 and, most preferably, 10 to 85 volume percent of a carboxylic acid anhydride, or anhydride added to maintain such levels before 10 percent, preferably 5 percent, of the reaction has been completed. The cencentration of anhydride is in all cases maintained at the limits recited in the preceding paragraph for the stated proportions of the reaction period.

The extraneous anhydride added before or during initiation of the reaction may be an anhydride of an acid having 2 to 25 carbons, preferaby 2 to 15 carbons and having the following structure:

$$RCOOH$$

wherein R is a hydrocarbon radical consisting of alkyl, monocyclic cycloalkyl and/or monocyclic aryl, preferably alkyl as defined in "The Handbook of Chemistry and Physics," 46th edition, by Weast. Typical R groups are methyl, hexyl, butyl, 2-methylhexyl, heptadecyl, cyclohexyl, cyclodecyl, phenyl, tolyl, xylyl, benzyl, 2-phenylhexyl, etc.

Examples of suitable anhydrides include acetic anhydride, n-butyric anhydride, caproic anhydride, 2-ethylhexanoic anhydride, enanthylic anhydride, 2-methylheptanoic anhydride, 4-butylhexanoic anhydride, 2-butylheptanoic anhydride, lauric anhydride, 2-pentylheptanoic anhydride, 3 - methylnonanoic anhydride, myristic anhydride, stearic anhydride, benzoic anhydride, toluic anhydride, 3-phenylhexanoic anhydride, 2-xylylpalmitic anhydride, 4-phenyl-5-isobutylstearic anhydride, cyclohexylbutyric anhydride, cyclopentylvaleric anhydride, propionic acid-n-butyric mixed anhydride, acetic acid-lauric acid mixed anhydride, and acetic acid-cyclohexylbutyric acid mixed anhydride, etc. Preferably the anhyride is a symmetrical anhyride of a $C_2$–$C_{11}$ straight-chain fatty acid, e.g., acetic anhydride, propionic anhydride, butyric anhydride, decanoic anhydride, etc. Most preferably the anhydride is the same as that produced since separation of the product anhydride from the reaction medium is thereby simplified.

The reactant olefinic compound may be any alpha monoethylenically unsaturated hydrocarbon having from 2 to about 24 carbons, preferably from 2 to about 14 carbons. The ethylenically unsaturated compound has the following general structure:

$$R_1R_2C=CH_2$$

wherein $R_1$ and $R_2$ are hydrogen or the same or different hydrocarbon radical consisting of alkyl, monocyclic cycloalkyl or monocyclic aryl as defined in "The Handbook of Chemistry and Physics," 46th edition by Weast, preferably hydrogen or alkyl.

Examples of useful ethylenically unsaturated hydrocarbons are ethylene, propylene, butene-1, 3-ethylhexene-1, 2-methyl-hexene-1, decene-1, 3,3-dimethylnonene-1, dodecene-1, undecene-1, 6-propyl-decene-1, 5-cyclohexyl-decene-1, 5,5-dipropylodecene-1, vinylcyclohexane, styrene, 6-phenylhexene-1, 1,3-diphenylbutene-1, 3-benzyl-heptene-1, 3-cycloheptyl-5-phenyldodecene-1, etc. Of the preceding the alpha aliphatic olefins having 2 to about 12 carbons and having a hydrogen on a beta carbon are preferred, e.g., ethylene, propylene, butene-1, hexene-1, heptene-1, octene-1, etc.

The reactant acid may be in general any carboxylic acid having 1 to about 25 carbons, preferably 1 to 18 carbons and having the formula:

$$RCOOH$$

wherein R is hydrogen or a hydrocarbon consisting of alkyl, monocyclic cycloalkyl and/or monocyclic aryl.

Examples of useful acids are formic, acetic, propionic, n-butyric, isobutyric, pivalic, n-valeric, n-caproic, caprylic, capric, decanoic, myristic, palmitic, naphthoic, stearic, benzoic, phthalic, terephthalic, toluic, 3-phenylhexanoic acid, 2-xylyl-palmitic acid and 4-phenyl-5-isobutyl stearic acid. The preferred acids are the fatty or alkanoic acids having 2 to about 12 carbons, e.g., acetic, propionic, n-butyric, isobutyric, pivalic, caproic, undecylic, etc.

The catalyst of the invention comprises a Group VIII noble metal in complex association with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein E is trivalent phosphorus, arsenic antimony or bismuth; and wherein R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc. and, most preferably, the ligand is triaryl.

Examples of suitable biphyllic ligands having the aforementioned structure and useful in my invention to stabilize the catalyst composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)-phosphine,
ethyldiphenylphosphine,
phenylditolylphosphine,
phenyldiisopropylphosphine,
phenyldiamylphosphine,
xylyldiphenylarsine,
tolyldi(m-xylyl)stibine,
trixylylphosphine,
trixylylarsine,
trixylylstibine,
cyclopentyldixylylstibine,
dioctylphenylphosphine,
tridurylphosphine,
tricumenylphosphine,
trixylylbismuthine, etc.

Of the aforementioned, the aryl phosphines and particularly the triarylphosphines (e.g., triphenylphosphine) are preferred because of their greater activity.

The Group VIII noble metal may have an atomic number from 44 to 46, inclusive i.e., ruthenium, rhodium, palladium or an atomic number from 76 to 78, inclusive, i.e., osmium, iridium or platinum and is preferably palladium due to its greater activity. A catalytic quantity of the metal is added (e.g., 0.002–2% of the reaction medium) and the metal may be added as a soluble salt, a carbonyl, a hydride or a a chelate.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferably that the quantity of biphyllic ligand be in excess (e.g., 10–300% of the stoichiometrically required to form a complex with the Group VIII metal). The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutylrate, valerate, etc.), halide, etc. may be but need not be included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide or bromide, or at least one $C_1$–$C_5$ carboxylate, e.g., acetate, propionate, butyrate, etc., since these groups, particularly halide, have been shown to improve the activity of the catalyst.

Examples of suitable sources of the noble metals are as follows: iridium carbonyl chloride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaamminorhodium(III) chloride, rhodium dicarbonyl chloride dimer, rhodium nitrate, rhodium trichloride, rhodium carbonyl hydride, ruthenium trichloride, tetraamminorutheniumhydroxychloro chloride; etc. Generally the halide salt and particularly the chloride salt are preferred sources of the Group VIII noble metal (e.g., palladium chloride, rhodium chloride, etc.) It is preferred that the source of the Group VIII noble metal be one wherein the anion to metal ratio is 2 to less, e.g., palladium chloride, rhodium nitrate, platinous iodide, etc.

The reaction is performed under liquid phase conditions and can be conducted in the presence of a suitable inert organic liquid, preferably a liquid which is a solvent for the reactants and catalyst. Suitable liquids include hydrocarbons, ketones, esters, ethers or an anhydride as described hereinabove. Suitable liquids are exemplified by hexane, heptane, octane, benzene, toluene cyclohexane cyclodecane, methyl ethyl ketone, diethyl ketone, ethyl n-butyl ketone, cyclohexanone, butyl ether, methyl tolyl ether, di-iso-amyl ether, methyl acetate, ethyl acetate, etc. The reaction can also be conducted in the absence of the above hydrocarbons, ketones, esters and ethers by conducting the reaction in an excess of the reactant acid, and/or reactant ethylenically unsaturated hydrocarbon if a liquid, e.g., 2–100 times that stoichiometrically required for the reaction. This can be accomplished for example in the batch process, by terminating the reaction prior to most of the acid and/or hydrocarbon being consumed or for example in the continuous process by adding sufficient acid and/or hydrocarbon to maintain the desired level.

In one embodiment, the reaction may be conducted in the presence of hydrogen which favors production of the straight-chain anhydride. This can be achieved by supplying gaseous hydrogen or by adding hydrogen-forming agents such as sodium borohydrate, lithium hydride, hydrazine, etc., to the reaction medium to provide a pressure of hydrogen therein from about 1 to 60 atmospheres, preferably 1 to 30 atmospheres (all pressures referred to herein are on an absolute basis). In some applications wherein higher conversions are desired, hydrogen pressures from 1 to about 13 atmospheres, preferably 1 to about 8 atmospheres, are also contemplated.

In another embodiment the reaction is performed in a limited amount of a strong mineral acid, e.g., a molar amount of acid equivalent to less than 0.5, preferably less than 0.05 times the molar amount of Group VIII noble metal. In the embodiment wherein the reaction is conducted in the presence of hydrogen and where the Group VIII noble metal is added as a halide, nitrate, sulfate, cyanide, i.e., anions of mineral acids, a mineral acid is formed "in situ" with the additional formation of a Group VIII metal hydride. Where the reaction is performed in the absence of hydrogen, the mineral acid, e.g., sulfuric, hydrochloric, hydrobromic, hydroiodic, nitric or cyanic may be added to the reaction medium. In either embodiment, the concentration of the acid should be controlled within the aforementioned limits. This can be achieved by addition of an acid acceptor to the reaction medium. Suitable acid acceptors or buffers include the alkali metal carboxylates, e.g., lithium acetate, sodium propionate, cesium butyrate, potassium acetate, cesium 2-ethylhexanoate, etc., and in general any carboxylate of a fatty acid having 1 to 20 carbons, preferably 2 to 15 carbons, e.g., acetate, propionate, isobutyrate, n-butyrate and valerate. Also an alkali or alkaline earth metal salt of an inorganic oxo, polyfunctional acid such as carbonic, arsenous, arsenic, boric acid is a suitable acid acceptor. Specific examples of these are cesium carbonate, potassium bicarbonate, barium carbonate, calcium carbonate, calcium arsenate, sodium arsenate, potassium borate, lithium arsenate.

The aforementioned acid acceptors, when employed, can be used in concentrations from about 0.01 to 5 weight percent, preferably 0.5 to 2 percent of the reaction medium, in amounts sufficient to lower the acid concentration to below the aforementioned maximum levels. Preferably, the amount of acid acceptor is insufficient to replace all of the preferred halide ligand since in such a case the activity of the catalyst decreases, which results in poor conversion of the reactants. Preferably, therefore, enough acid acceptor, preferably a $C_1$–$C_5$ carboxylate, is added to replace all but one halide but insufficient to replace all the halide ligand. The acid acceptors may be incorporated in the reaction medium as solutions or as slurries or may be added as finely divided solids with a particle size from about 0.001 to about 0.5 inch average particle diameter to insure a sufficient surface area for adequate contacting with the reaction medium and complete adsorption of the acid during the reaction. The acid acceptors are particularly advantageous when carboxylic acids are the solvent and/or the product of the reaction.

In still another embodiment, the reaction is performed in a limited amount of anion equivalent. Preferably, the reaction is conducted in the presence of hydrogen. The molar amount of anion equivalent (including that in complex with the Group VIII noble metal) should be maintained from 0.1 to 2.0, preferably from 0.5 to 1.5 times the molar amount of Group VIII noble metal. In general, the amount of anion equivalent may be increased by adding an appropriate salt or decresed by known ion exchange and/or precipitation methods.

The reaction may be performed at temperatures between 100°–300° C., preferably between 130° and 250° C., most preferably between 140° and 200° C. The reaction can be performed at pressures from 1 to 70 atmospheres, preferably 5 to 30 atmospheres, sufficient to maintain liquid phase conditions. The desired pressure may be maintained by adding an inert gas, e.g., nitrogen to the reaction mixture. In some instances, the pressure of the reactant hydrocarbon, if a gas, and/or carbon monoxide is sufficient to maintain the aforementioned pressures.

The reaction can be performed batchwise or in a continuous fashion. When operating batchwise, the catalyst, the reaction medium, the hydrocarbon if a liquid, the reactant acid and the anhydride can be introduced into the reaction zone to form a liquid phase therein and the reaction zone can be pressured with carbon monoxide and heated to the desired reaction temperature. When the hydrocarbon is a gas it of course can be added with the carbon monoxide or at any time prior to the heating of the reaction medium. When performing the reaction in a continuous fashion the liquid components can be charged to the reaction zone to form a liquid phase therein and the hydrocarbon, carboxylic acid and carbon monoxide continuously introduced into the reaction zone to contact the reaction medium containing the catalyst.

The gaseous reactants can be withdrawn as a separate effluent, cooled, depressured and the non-condensibles, chiefly carbon monoxide, can be recycled to further contacting. The liquid product can be withdrawn separately from the reaction zone by withdrawing a stream of the liquid reaction medium contained therein and the desired anhydride recovered by conventional separation processing such as distillation. Part of the product, either the straight or branched-chain anhydride, may be recycled to the reaction zone to maintain the requisite anhydride concentration therein. Preferably, the branched-chain product is recycled since I have also discovered that the reaction is reversible, conditions of reversibility being favored at the aforementioned preferred temperatures.

EXAMPLE 1

The following example illustrates the practice of the invention and demonstrates the results actually obtained:

To a one-gallon stirred autoclave were added 1 gram palladium chloride, 6 grams triphenylphosphine, 350 milliliters acetic acid, 80 grams 1-octene and 50 milliliters acetic anhydride. The autoclave was purged twice with nitrogen and pressured with carbon monoxide to 21 atmospheres. The mixture was then heated to and maintained at 150° C. for 6 hours while being stirred. Water was added to the autoclave to hydrolyze the resulting anhydride product. The liquid contents of the autoclave were removed and analyzed to reveal that 40 grams nonanoic acid and 10 grams of alpha-methyl-octanoic acid had been formed in the process. The ratio of straight-chain products to branched-chain products was thus 4.0. The amount of anhydride in the medium just prior to termination of the reaction was about 22 volume percent.

EXAMPLE 2

The following example demonstrates the results obtained when an anhydride is *not* initially added to the reaction medium and the concentration of anhydride *not* maintained over 10 volume percent for 30–100% of the reaction period.

To the autoclave used in Example 1 were added 1 gram palladium chloride, 6 grams triphenylphosphine, 400 milliliters acetic acid and 80 grams 1-octene. The autoclave was purged with nitrogen and pressured with carbon monoxide to 21 atmospheres. The mixture was then heated to and maintained at 150° C. for 6 hours while being stirred. Water was then added to hydrolyze the anhydride products to acids. The liquid contents were removed and analyzed to reveal that about 33 grams of nonanoic acid and 14 grams of α-methyloctanoic acid were formed. The ratio of normal to branched-chain acids in the final product was thus 2.3. The amount of anhydride in the reaction medium just prior to termination of the reaction was about 9 volume percent. This 2.3 ratio obtained at a low anhydride concentration compares unfavorably with the 4.0 ratio of Example 1 wherein anhydride was initially added.

The following Examples 3–6 illustrate other modes of practice presently contemplated.

EXAMPLE 3

To an autoclave is added 1 part by weight platinum chloride, 7 parts tributylphosphine, 300 parts palmitic acid, 200 parts of pentadecene-1, and 50 parts of 5-phenylmyristic anhydride. The autoclave is purged with nitrogen and pressured with 20 atmospheres of carbon monoxide. The mixture is heated to and maintained at 190° C. for 8 hours while being stirred. Formation of palmitic anhydride formed in the process can then be added to the reaction medium to be used in a subsequent experiment and an increase in the ratio of straight-chain to branched-chain will be observed.

The 50 parts of 5-phenylmyristic anhydride used in the above example can be substituted by 65 parts of stearic anhydride or 80 parts of 3-cyclohexyllauric anhydride without a substantial change in the illustrated mode of practice.

EXAMPLE 4

To an autoclave are added 1.5 grams palladium chloride, 6 grams tritolylphosphine, 500 grams 5-phenyldocosanoic acid, 300 parts of 3-butyl-5-benzylnonadecene-1 and 38 parts of benzoic acid-acetic acid mixed anhydride. The autoclave is purged with nitrogen and pressured with carbon monoxide to 10 atmospheres. The mixture is then heated to and maintained at 200° C. for 15 hours while being stirred. The heating is discontinued, the autoclave is allowed to cool and the contents are removed. The liquid contents may be distilled to recover 4-butyl-6-benzyl-eicosanic-5-phenyldocosanoic mixed anhydride.

EXAMPLE 5

To an autoclave is added 1 part palladium chloride, 7 parts triphenylphosphine, 300 parts acetic acid and 200 parts octene-1. The autoclave is purged with nitrogen and pressured with carbon monoxide to 25 atmospheres. The mixture is heated to and maintained at 200° C. for 6 hours while being continuously stirred. At the end of the 6-hour period, a sample of the reaction medium is withdrawn and analyzed. The contacting is continued for another 6 hours, the heating discontinued, the autoclave allowed to cool and the contents removed and analyzed. It may be observed that the ratio of nonanoic anhydride to α-methyloctanoic anhydride formed is greater in the second 6-hour period than in the first 6-hour period.

EXAMPLE 6

To a reactor are added an initial charge of 1 part palladium chloride, 7 parts triphenylphosphine, 100 parts acetic acid and 100 parts octene-1 to fill approximately 10 volume percent of the reactor. The reactor is pressured with carbon monoxide to 30 atmospheres and is heated to 200° C. for about 2 hours such that the anhydride concentration is about 25 volume percent of the reaction medium. Acetic acid and octene-1 are continuously fed to the reactor until enough anhydride is formed to give an anhydride concentration of 40% of the reaction medium. The addition of acetic acid and octene-1, as well as carbon monoxide and make-up catalyst and biphyllic ligand is continued and reaction medium comprising anhydride, reactants and catalyst is continuously withdrawn to maintain a constant liquid level. The nonanoic and α-methyloctanoic anhydrides are separated from the reactants and catalyst. Nonanoic anhydride is transferred to product storage. The α-methyloctanoic anhydride, along with the removed reactants and catalyst, is recycled to the reactor.

I claim:
1. In a hydrocarboxylation process for production of anhydrides wherein an alpha mono-ethylenically unsaturated hydrocarbon having 2 to 24 carbons is contacted with carbon monoxide and a carboxylic acid having 2 to 25 carbons in a liquid medium containing a Group VIII noble metal having an atomic number from 44 to 46 or from 76 to 78, inclusive, in complex with a biphyllic ligand having the formula:

$$ER_3$$

wherein E is trivalent phosphorus, arsenic, antimony or bismuth; and wherein R is the same or different alkyl having 1 to about 10 carbons, cycloalkyl having 4 to about 10 carbons or aryl having 6 to about 10 carbons at a temperature between about 100° and 300° C. and at a pressure from 1 to 70 atmospheres sufficient to maintain liquid phase reaction conditions; the improvement of obtaining a high yield of straight chained anhydride which comprises conducting the hydrocarboxylation reaction for 30–100 percent of the reaction period in the presence of from 10 to 85 volume percent of an anhydride of an acid having 2 to 25 carbons and having the formula:

$$RCOOH$$

wherein R is a hydrocarbon radical consisting of alkyl, monocyclic cycloalkyl, and/or monocyclic aryl.

2. The process of claim 1 wherein said added anhydride comprises from 20 to 85 volume percent of the reaction medium and is an anhydride of a fatty acid.

3. The process of claim 1 wherein the Group VIII noble metal is palladium and wherein the biphyllic is a triarylphosphine.

4. The process of claim 1 wherein the reactant acid is a fatty acid.

5. The process of claim 1 wherein the reaction is conducted at a temperature between 130° and 250° C. and the product branched-chain anhydride is separated from the product straight-chain anhydride and recycled to the reaction medium.

6. The process of claim 1 wherein said ethylenically unsaturated hydrocarbon is an alpha olefin having a hydrogen on a beta carbon, said acid is a fatty acid, said Group VIII noble metal is palladium, said biphyllic ligand is a triarylphosphine and said temperature is 140° to 200° C.

7. The process of claim 6 wherein the branched-chain anhydride formed in said process is recycled to the reaction medium.

8. The process of claim 1 wherein said reaction is initiated with a reaction medium containing 5 to 85 volume percent of said anhydride.

9. The process of claim 1 wherein said anhydride comprises from 35 to 85 percent of the reaction medium.

10. The process of claim 9 wherein said ethylenically unsaturated hydrocarbon is an alpha olefin having a hydrogen on a beta carbon, said acid is a fatty acid, said Group VIII noble metal is palladium, said biphyllic ligand is a triarylphosphine and said temperature is 140° to 200° C. and wherein said amount of anhydride is maintained for 60 to 100 percent of the reaction period.

11. The process of claim 1 wherein said anhydride is added to maintain an anhydride concentration of 5 to 85 volume percent before 10 percent of the reaction has occurred.

References Cited

UNITED STATES PATENTS

| 3,161,672 | 12/1964 | Zachry et al. | 260——486 |
|---|---|---|---|
| 3,381,030 | 4/1968 | Biale et al. | 260—497 |
| 3,437,676 | 4/1969 | Kutepow et al. | 260—468 |

LORRAINE A. WEINBERGER, Primary Examiner

R. GERSTL, Assistant Examiner

U.S. Cl. X.R.

260—546